United States Patent [19]

Roderick

[11] 3,855,214

[45] Dec. 17, 1974

[54] 2,3-DIHYDRO-1H-PYRIDINO[2,3-B][1,4]-THIAZINE-2-ONE-4-OXIDE

[75] Inventor: William Rodney Roderick, Libertyville, Ill.

[73] Assignee: Abbott Laboratories, North Chicago, Ill.

[22] Filed: Sept. 28, 1972

[21] Appl. No.: 293,253

Related U.S. Application Data

[63] Continuation-in-part of Ser. No. 151,483, June 9, 1971, Pat. No. 3,733,411.

[52] U.S. Cl. ............................. 260/243 R, 424/246
[51] Int. Cl. ............................................ C07d 93/12
[58] Field of Search .................. 260/243 R, 294.8 C

[56] References Cited
UNITED STATES PATENTS
3,546,220   12/1970   Stein et al. ...................... 260/243 R

OTHER PUBLICATIONS

Culvenor, Pure and Applied Chemistry Reviews, Vol. 3, Amine Oxides, Pages 83–86, (1953), QD1 R6.

Bickel, Pharmacological Reviews, Vol. 21, No. 4, Williams & Wilkins Publishers, Pages 348–349, Dec. 1969.

Primary Examiner—Alan L. Rotman
Attorney, Agent, or Firm—Paul D. Burgauer; Robert L. Niblack

[57] ABSTRACT

2,3-Dihydro-1H-pyridino-[2,3-b][1,4]-thiazin-2-one 4-oxide has been found to possess excellent anti-inflammatory, analgesic and anti-pyretic activity when administered in small doses to warm-blooded animals.

1 Claim, No Drawings

2,3-DIHYDRO-1H-PYRIDINO[2,3-B][1,4]-THIAZINE-2-ONE-4-OXIDE

HISTORY OF THE INVENTION

This application is a continuation-in-part of U.S. Pat. application Ser. No. 151,483, filed in the name of William Rodney Roderick on June 9, 1971, now U.S. Pat. No. 3,733,411 dated May 15, 1973.

DETAILED DESCRIPTION OF THE INVENTION

The present invention is directed to 2,3-dihydro-1H-pyridino-[2,3-b][1,4]-thiazin-2-one 4-oxide and its anti-inflammatory, analgesic and anti-pyretic activity. The new compound shows no toxic manifestations at oral doses of 1,000 mg./kg. in mice and even the intraperitoneal $LD_{50}$ in mice is well above 1000 mg./kg. The free base shows an oral $ED_{25}$ of 35 mg./kg. in rats as anti-inflammatory, an oral $ED_{50}$ of 90 mg./kg. as anti-pyretic in rats and an oral $ED_{50}$ of 45 mg./kg. as an analgesic in mice. For lower animals, a dose of 25-100 mg./kg. produces excellent anti-inflammatory, analgesic and anti-pyretic effects while in higher animals, a dose of 2.5-20 mg./kg. is recommended.

In a simple, general embodiment, the new compound is made by oxidizing 2,3-dihydro-1H-pyridino-[2,3-b][1,4]-thiazin-2-one (described in U.S. Pat. No. 3,546,220) with an equimolar amount of a peroxide, preferably a haloperbenzoic acid such as m-chloroperbenzoic acid in a suitable organic solvent, for example, chloroform.

In order to illustrate the method for preparing the above compound, reference is made to the following Example which, however is not meant to reduce the scope of the invention in any fashion.

EXAMPLE

A solution of 4.99 g. of 2,3-dihydro-1H-pyridino-[2,3-b][1,4]-thiazin-2-one in 1200 ml. of chloroform was placed in a 3-liter 3-neck flask equipped with stirrer, thermometer and dropping funnel. A solution of 6.13 g. of 85 percent m-chloroperbenzoic acid in 150 ml. of chloroform was added dropwise over a period of 45 minutes. The mixture was filtered and allowed to stand at room temperature. The slowly forming colorless crystals were collected and a further crop was obtained after cooling the solution in ice overnight. The crystals decomposed at 170° C. without prior melting; they were obtained in a yield of 70 percent of theory. The analytical values confirmed the crystals to be 2,3-dihydro-1H-pyridino-[2,3-b][1,4]-thiazin-2-one 4-oxide. The new compound is stable in solid form as the free base but decomposes slowly in aqueous solution upon extended storage.

The anti-inflammatory effect of the compound was established by the following procedure: edema is produced in the paws of rats by the injection of carrageenan according to the method described in Winter, et al. (Proc. Soc. Exp. Biol. Med., 1962, Vol. III, page 544). The above compound was administered orally at dosages (6 rats per dosage) of 10, 25 and 50 mg./kg. 30 minutes prior to the administration of the carrageenan. Edema is expressed as percentage increased over normal paw size and edema inhibition is calculated from the difference between the average edema size of a control group and the average edema size of the test group. The above dosages show edema inhibition of 3 percent, 10 percent and 41 percent, respectively. The oral $ED_{25}$ (i.e., the dose required to produce 25 percent reduction in edema size) was determined from a dosage/effect curve drawn on logarithmic graph paper and was established to be 35 mg./kg.

The anti-pyretic activity of the above compound was established in the following manner: fever was produced in rats by intramuscular injection of an aqueous suspension of brewer's yeast. After fever was stabilized, the test compound was administered orally and rectal temperatures were taken one, 2 and 3 hours after drug administration. The 3 hour reading was used to calculate fever percentage reduction between the test group and the control group of animals, each group comprising 4 to 6 animals. With doses of 25, 50 and 100 mg./kg., fever reduction of 12 percent, 19 percent and 53 percent, respectively, was observed. The $ED_{50}$ (50 percent reduction of fever) for the above compound was found to be 90 mg./kg.

Analgesia produced with the base of the present invention was established by a modification of the method described by Whittle (Brit J. Pharm., 1964, Vol. 22, page 246): mice are pre-treated with the test compound or a placebo by oral administration thereof. Twenty minutes later, the mice were injected intravenously with 100 mg./kg. of a 1 percent Evans Blue solution in isotonic saline followed in 10 minutes by an intraperitoneal injection of 0.4 ml. of 0.5 percent aqueous acetic acid. Writhing produced by the acid is counted for a period of 20minutes. Analgesic effect is the percent inhibition of writhes calculated from the difference between the control group and the test group. Each group of test and control animals comprises 5 mice. At doses of 12.5, 25, 50 and 100 mg./kg., the writhing inhibition with the new compound was found to be 22 percent, 41 percent, 55 percent and 64 percent, respectively; the oral $ED_{50}$ in mice is 45 mg./kg.

While the above therapeutic effect was demonstrated by oral administration, it is to be understood that intraperitoneal and intramuscular administration is similarly effective. For ease of proper and convenient dispensing, free 2,3-dihydro-1H-pyridino-[2,3-b][1,4]-thiazin-2-one 4-oxide can easily be processed into tablets, wafers, syrups, pills or capsules for oral administration or clear aqueous solutions suitable for injections. A suitable unit dosage form contains between 25 and 100 mg./dose which, in the simplest embodiment is incorporated into a capsule. Tablets containing said amount of the drug can be prepared in the manner well known in the art, including the usual excipients such as fillers, lubricants, disintegrating agents, flavoring agents, etc. In order to prepare an elegant pharmaceutical tablet form, such tablets may be coated containing a pigment or pharmaceutically acceptable dye which may be included in the coating formulation or be mixed in with the tableting formulation. A suitable human daily dose is 100 mg./day, preferably given in 2-4 sub-doses.

When a liquid formulation is desired, proper stabilizers or preservatives should be added to prevent premature decomposition or the liquid dosage form should be prepared only shortly before administration.

Suitable media for such formulation are water or sugar solutions and preferably, the concentration of the liquid formulation is such that a given volume, i.e. one teaspoon, represents a unit dose or the desired amount for being taken by an adult once or several times a day.

I claim:

1. 2,3-Dihydro-1H-pyridino-[2,3-*b*][1,4]-thiazin-2-one 4-oxide.

* * * * *